United States Patent [19]
Goto

[11] Patent Number: 5,761,870
[45] Date of Patent: *Jun. 9, 1998

[54] CONNECTING STRUCTURE OF CONCRETE BLOCKS AND CONNECTING METHOD THEREFOR

[75] Inventor: Yasuo Goto, Oita-ken, Japan

[73] Assignee: Home Co., Ltd., Oita-Ken, Japan

[*] Notice: The term of this patent shall not extend beyond the expiration date of Pat. No. 5,466,086.

[21] Appl. No.: 513,771

[22] PCT Filed: Dec. 27, 1994

[86] PCT No.: PCT/JP94/02242

§ 371 Date: Aug. 29, 1995

§ 102(e) Date: Aug. 29, 1995

[87] PCT Pub. No.: WO95/18275

PCT Pub. Date: Jul. 6, 1995

[30] Foreign Application Priority Data

Dec. 31, 1993 [JP] Japan ................................ 5-352933

[51] Int. Cl.$^6$ ............................................. F16B 11/00
[52] U.S. Cl. .................... 52/562; 52/564; 52/568; 52/585.1; 52/742.15; 52/438; 403/268
[58] Field of Search ................ 52/562, 564, 565, 52/568, 742.13, 742.14, 742.15, 582.1, 587.1, 585.1, 418, 437, 438, 259; 411/82, 258; 405/259.5; 403/265, 267, 268, 269, 292, 298; 156/91, 92, 305; 425/13

[56] References Cited

U.S. PATENT DOCUMENTS

| | | | |
|---|---|---|---|
| 605,468 | 6/1898 | Bennett | 52/585.1 X |
| 961,992 | 6/1910 | Underwood | 403/267 |
| 3,359,742 | 12/1967 | Blatter | 405/259.5 |
| 3,780,484 | 12/1973 | Muse | 52/568 X |
| 4,247,223 | 1/1981 | Amakasu et al. | 405/259.5 X |
| 4,370,372 | 1/1983 | Higgins et al. | 428/116 |
| 4,395,859 | 8/1983 | Rohrer | 52/742.15 X |
| 4,630,959 | 12/1986 | Glaser | 403/266 |
| 4,681,477 | 7/1987 | Fischer | 411/82 X |
| 4,712,957 | 12/1987 | Edwards et al. | 411/85 |
| 4,752,151 | 6/1988 | Ashida et al. | 403/267 |
| 5,033,904 | 7/1991 | Challis | 403/282 |
| 5,366,672 | 11/1994 | Albrigo et al. | 52/742.15 X |
| 5,466,086 | 11/1995 | Goto | 403/268 |

FOREIGN PATENT DOCUMENTS

| | | | |
|---|---|---|---|
| 2447430 | 9/1980 | France | 403/267 |
| 2838466 | 3/1980 | Germany | 411/82 |
| 50-17010 | 2/1975 | Japan . | |
| 59-179927 | 10/1984 | Japan | 405/259.5 |
| 2-178402 | 7/1990 | Japan . | |
| 2-109842 | 9/1990 | Japan . | |
| 289090 | 9/1928 | United Kingdom | 403/265 |
| 970775 | 9/1964 | United Kingdom | 405/259.5 |
| 2218483 | 11/1989 | United Kingdom | 403/265 |

*Primary Examiner*—Wynn E. Wood
*Assistant Examiner*—Laura A. Callo
*Attorney, Agent, or Firm*—Lane, Aitken & McCann

[57] ABSTRACT

The present invention provides a connecting structure of concrete blocks and a method for connecting the concrete blocks in which a special structure for use in connecting the concrete blocks is not required, a rigid connection can be carried out with a simple connecting structure, a removal of the connector is eliminated, a workability is remarkably improved, a productivity of buildings is improved and at the same time it has a superior anti-disaster effect. The connecting structure is comprised of either a hollow rod-like connection member, a plurality of concrete blocks, a pair of connecting holes bored at abutting surfaces between concrete blocks, and adhesive agent poured at one end of the connector flowed out the opposite end and thus filled between the exterior surface of said connector and circumferential walls of said connecting holes.

6 Claims, 15 Drawing Sheets

FIG. 7(a)
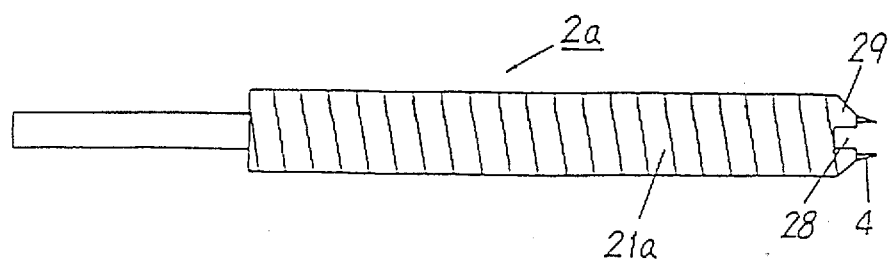
FIG. 7(b)
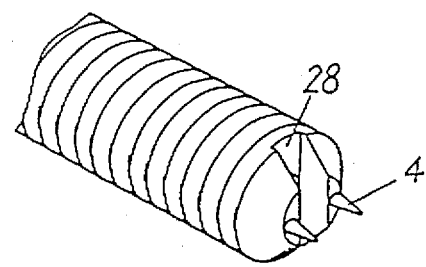
FIG. 8(a)    FIG. 8(b)    FIG. 8(c)    FIG. 8(d)    FIG. 8(e)
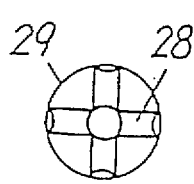 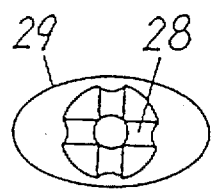 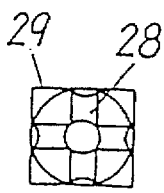 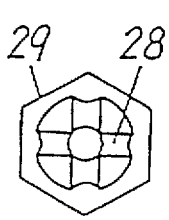 

CONNECTING STRUCTURE OF CONCRETE BLOCKS AND CONNECTING METHOD THEREFOR

TECHNICAL FIELD OF THE INVENTION

This invention relates to a connecting structure of concrete blocks and a connecting method therefor such as precast concrete (hereinafter called as "PC") member, and the like.

DESCRIPTION OF THE RELATED ART

In recent years, some concrete blocks such as PC member and the like have been frequently used in order to provide a labour saving in work as well as a rationalization in dwellings or buildings, other constructions and civil engineering and the like. And further various connecting structures and connecting methods therefor have been developed in respect to the connection of these concrete blocks.

As disclosed in the gazette of Japanese Utility Model Laid-Open No. Sho 62-159598 (hereinafter called as "(a)") and the gazette of Japanese Utility Model Publication No. Hei 2-23663 (hereinafter called as "(b)"), the connection of the PC members in the prior art has been performed in the step of (1) connecting the PC members from each other with bolts, or (2) welding the fittings fixed to the connecting surfaces of the PC members from each other, or (3) welding the connecting iron bars projected from the connecting surfaces of the PC members to each other, thereafter filling with mortar or adhesive agent and the like between their connected parts.

In addition, as indicated in the gazette of Japanese Utility Model Publication No. Hei 2-7995 (hereinafter called as "(c)"), the connecting structure in which the concrete blocks such as PC member and the like are connecting to each other with adhesive agent by applying the connector is disclosed as "the connecting structure of concrete blocks comprising a main body of concrete structure and a sub-body of concrete structure connected to the main body characterized in that some pin insertion holes of frustum of circular cone having an inner diameter slightly larger than an outer diameter of the insertion pin are formed at the predetermined locations at the connecting surface of the main body, through-pass holes of inverse frustum of circular cone having the same diameter as that of the pin insertion hole and extending coaxially are formed the locations at the connecting surface of the sub-body corresponding to the pin insertion holes, some pins are inserted from the through-pass holes over the main body and the sub-body and at the same time coupling material is filled around the pins." As indicated in the gazette of Japanese Utility Model Laid-Open No. Sho 62-151306 (hereinafter called as "(d)"), the connecting structure is disclosed as "the connecting structure of the PC members characterized in that a pair of PC members having connection grooves opened are arranged at each of the connecting surfaces, connector fittings provided with hollow parts having a plurality of feeding holes for mortar or adhesive agent are fitted into each of the grooves, either mortar or adhesive agent is poured into said hollow parts of the connector fittings and then either said mortar or adhesive agent is filled in the hollow parts and the clearances between the connecting grooves and the connector fittings as well as in the clearances between the connecting surfaces of each of the members".

However, the constitution disclosed in each of the aforesaid gazettes of Nos.(a) and (b) could be constructed such that the concrete structures can be easily connected to each other by inserting or fitting the bolts into the projected portions in the connected surfaces oppositely faced from each other in the concrete structures or by inserting the connector bolts into the coupler fittings, although they had some problems that it was necessary to arrange some concave portions for use in embedding the concrete structures and the coupling fittings or bolts, resulting in that their manufacturing steps became complicated. In addition, they had some problems that the concrete structures were loosened by vibration caused under the fastening arrangement with bolts and nuts. In addition, the prior art had a problem that when the connector fittings or bolts were buried with mortar or the like, the work required much time and so a lack of workability occurred. Further, the prior art had another problem that the connector fittings or bolts were rusted with rain water to expand by themselves to cause concrete or mortar to be damaged.

In addition, the configuration described in the gazette (c) above had a problem that after pins were inserted into pin insertion holes, binding material was filled in the holes, so that the pins hindered a filling operation to cause the binding material to be hardly filled. Additionally, the prior art had a still further problem that the binding material such as resin mortar or the like had a high viscosity, so that a filling operation took much time and a lack of workability occurred. In addition, since only the fine pins could be used, the pins were inserted into the pin insertion holes in slanted state and so the prior art had a problem that filling of the filling material was hardly accomplished and some non-uniformity were easily generated.

The configuration described in the gazette (d) had a problem that some grooves having a desired shape for fitting a groove forming mold should be cut and formed at the connecting surfaces of the PC members from external part in compliance with a size of the mold, resulting in that the work was troublesome and a lack of workability occurred. Further, the prior art had a problem that the mortar leakage preventing mold frame should be arranged during the connecting work, and after connecting work, the mold frame should be removed, then coating material had to be filled in the location where the mold frame was removed and the large number of steps was required, a skill in the work was required, a large number of working persons and time were required and a shortening of working period was lack. Further, the prior art had a problem that an air accumulation part was easily formed inside the hole due to a high viscosity of mortar and a mechanical strength was remarkably reduced.

DISCLOSURE OF THE INVENTION

This invention solves the aforesaid problems in the prior art and its object is to provide the connecting structure of concrete blocks and the connecting method therefor in which their strong connections can be carried out with an easy connecting structure, no removal of the connector occurs, their workability is remarkably improved, productivity of a building and the like is improved and at the same time an anti-disaster characteristic is superior.

In order to accomplish the object, the present invention has the following constitutions, respectively.

The connecting structure of concrete blocks as defined in claim 1 is comprising concrete blocks with a pair of opposing connecting holes bored at abutting surfaces between said concrete blocks; a connector consisting of a rod-like member with a hollow part, inserted and fixed said pair of opposing connecting holes; an adhesive agent poured from one end of said hollow part, flowed out of an opening at the end of said hollow part, and thus filled between the surface of said connector and circumferential walls of said connecting holes.

The connecting structure of concrete blocks as defined in claim 2 is comprising concrete blocks with a pair of connecting holes bored at abutting surfaces between said concrete blocks; a connector consisting of a rod-like member with a hollow part at a longitudinal central part and a branch pipe engaged with one end of said hollow part, inserted and fixed said pair of opposing connecting holes; an adhesive agent poured from one end of the hollow part of branch pipe, flowed out of an opening at the end of said hollow part of rod-like member, and thus filled between the surface of said connector and the circumferential walls of said connecting holes.

The connecting structure of concrete blocks as defined in claim 3 is comprising concrete blocks with a pair of connecting holes bored at abutting surfaces between said concrete blocks and a branch pipe installing groove on the surface of said abutting surfaces; a connector consisting of a rod-like member with hollow part at a longitudinal central part and a branch pipe engaging part having a hollow part at said rod-like member and communicated from an outer circumferential part of said rod-like member with said hollow part of said rod-like member, and a branch pipe fixed or removably engaged with said branch pipe engaging part, inserted and fixed said rod-like member in said pair of opposing connecting holes and said branch pipe in said groove; an adhesive agent poured into one end of said branch pipe, flowed out of an opening at the end of said hollow part of said rod-like member, and thus filled between the surface of said connector and the circumferential walls of said connecting holes.

The connecting structure of concrete blocks as defined in claim 4 is comprising concrete blocks with a pair of connecting holes bored at abutting surfaces between said concrete blocks; a connector consisting of a solid rod-like member with an adhesive agent feeding pipe formed in a longitudinal direction of its outer circumferential surface and an adhesive agent feeding pipe having an adhesive agent feeding-in part at one end and an adhesive agent flowing-out part at the other end, inserted and fixed said solid rod-like member in said pair of opposing connecting holes; an adhesive agent poured from said adhesive agent flowing-in part of said adhesive agent feeding pipe, flowed out of said adhesive agent flowing out part of said hollow part of said adhesive agent feeding pipe, and thus filled between the surface of said connector such as said solid rod-like member and the circumferential walls of said connecting holes.

The connecting structure of the concrete blocks as defined in claim 5 is comprising concrete blocks with a pair of connecting holes bored at abutting surfaces between said concrete blocks and a branch pipe installing groove on the surface of said abutting surfaces; a connector consisting a solid rod-like member with an adhesive agent feeding pipe formed in a longitudinal direction of its outer circumferential surface and an adhesive agent feeding pipe having the adhesive agent flowing-out parts at the both ends and a branch pipe linked with the middle of hollow part of said adhesive agent feeding pipe at its substantial central part, inserted and fixed said solid rod-like member in said pair of opposing connecting holes and said branch pipe in branch pipe installing groove; an adhesive agent poured from an adhesive agent flowing-in part of said branch pipe, flowed out of said flowing-out parts of said adhesive agent feeding pipe, and thus filled between the surface of said connector and the circumferential walls of said connecting holes.

The connecting method of concrete blocks as defined in claim 6 is comprising the steps of inserting and fixing a connector into and to connection holes of concrete blocks formed with a pair of connection holes having a diameter substantially the same as that of or slightly larger than a cross section of the connector at each of the abutting surfaces and abutting each of the concrete blocks; and pouring adhesive agent from one end of the hollow part of said connector inserted into and fixed to the connection holes at said step, flowing it out of the other end opening and filling the adhesive agent between the surface of said connector and the circumferential walls of said connection holes.

The connecting method of concrete blocks as defined in claim 7 is comprising the steps of inserting and fixing a rod-like member of the connector and a branch pipe into said connection holes and branch pipe installing grooves of a plurality of concrete blocks formed with the connection holes and branch pipe installing grooves having substantially the same diameter as or slightly larger than that of a cross section of the rod-like member of the connector or that of the branch pipe at each of the abutting surfaces and abutting each of the concrete blocks from each other; and pouring adhesive agent from an opening of the branch pipe of said connector inserted into and fixed to the connection holes and the branch pipe installing grooves at the aforesaid step, flowing it out from openings at both ends of said hollow part of said rod-like member of said connector and filling adhesive agent between the surface of said connector and a circumferential wall of said connection hole.

In this case, the concrete blocks are defined as PC members of secondary product of concrete such as PC panels used in a dwelling or a construction of building; PC floor beams; PC wall concretes used in concrete blocks, gate columns, fences, stone materials or railway tunnels or sealing work at an underground road or the like; U-shaped grooves; gutters; PC culverts; PC retaining walls; water passages and water tanks and the like. As adhesive agents, it is possible to apply mortar, various kinds of cements and resin concretes in addition to epoxy resin system, polyurethane resin system, vinyl acetate system, silicone adhesive agent. In the case that mortar or cement is applied, it is possible to prevent corrosion of the connector caused by dew formation or salt damage by applying a connector made of stainless steel, a connector having a surface made of synthetic resin or having a multi-layer structure or applying a connector made of ceramics.

In addition, it is possible to prevent adhesive agent from being leaked at the connecting surfaces by applying a sealing material such as a double-adhesive surface tape or a seal member and the like to the connecting surfaces of the concrete blocks to be connected to each other. Further, since it is possible to form an adhesive agent accumulation part enclosed by a seal material or an adhesive agent coating part to which adhesive agent is applied during connecting operation at the connecting surfaces, it is possible to apply different kinds of adhesive agents in advance.

Connection holes or cutting parts are merely formed at each of the abutting surfaces of the concrete blocks, connectors are inserted, fixed and embedded in the concrete blocks and then adhesive agent or mortar and the like are merely poured into them, so that the execution steps can be quite simplified and the number of steps of work can be reduced. Irrespective of a simple connecting structure, it is possible to perform a rigid connection of the concrete blocks, so that it is also possible to increase remarkably an effect of anti-disaster. Since a visual inspection hole is arranged, it is possible to pour adhesive agent down to a bottom part of the hole and the adhesive agent is charged through helical irregularities at the surface of the connector, resulting in that it is also possible to discharge air out of the connection holes and to prevent some charging patterns from being generated. In addition, it is also possible to prevent adhesive agent from being leaked out of the connecting surfaces through the seal material at the connecting surfaces and to get a quite strong adhering yield strength by applying different kinds of adhesive agents. It is possible to eliminate removal of the connectors, improve remarkably workability and further improve productivity of a building structure and the like.

As described above, the present invention is constructed such that the connectors are inserted into and fixed inside the concrete blocks and further coated with adhesive agent, so that it is possible to prevent salt damage or dew formation and further to make a remarkable improvement of durability at the connecting structure without producing any corrosion at all. In addition, since the connectors may not be visually seen from outside, it is possible to make a connected coupler structure and to increase an additive value of the structure. It is possible to prevent the structure from being fallen through a rigid connection of it and make a remarkable improvement of safety characteristic.

In addition, the concrete blocks such as PC plates made at a factory and the like in advance can be easily connected at a working site so as to construct a long and large concrete structure.

Since such effects as described above can be attained by a small number of connectors during execution of work, it is possible to realize both the connecting structure of the concrete blocks and their connecting method which can remarkably improve workability, labour-saving and rationalization during execution of work.

BRIEF DESCRIPTION OF THE DRAWINGS

FIG. 7(a) is a side elevational view of a conector in the second preferred embodiment of the present invention.

FIGS. 7(b) is a perspective view of a substantial part of a flowing-out end part of adhesive agent of a connector in the second preferred embodiment of the present invention.

FIGS. 8(a) to 8(e) are front views of a substantial part of a flowing-out end parts of an adhesive agent of various shapes of rod-like members of connectors in the second preferred embodiment of the present invention.

DESCRIPTION OF THE PREFERRED EMBODIMENTS

Figure 1:
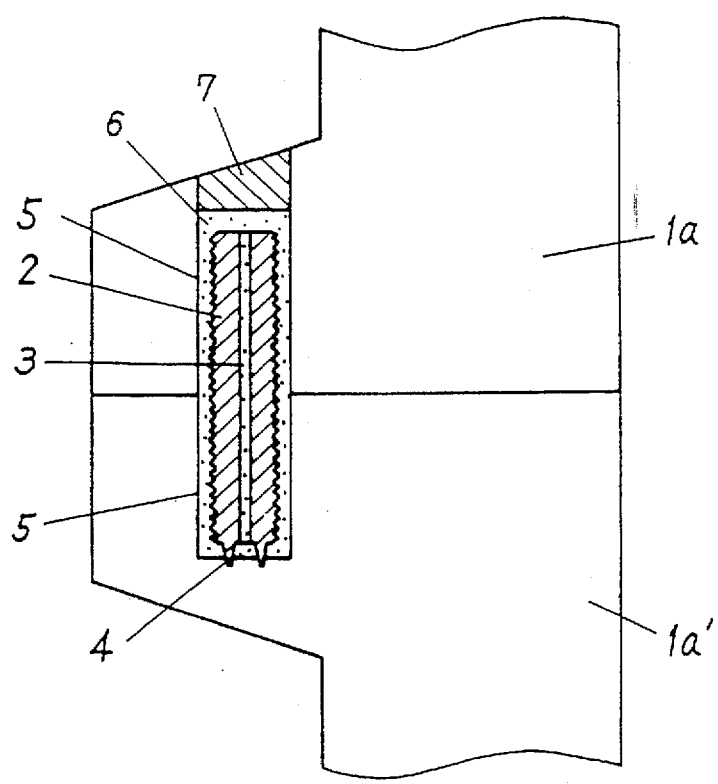
FIG. 1 is a sectional view of a substantial part showing a connecting structure of concrete blocks in the first preferred embodiment of the present invention.

Referring now to the drawings, one preferred embodiment of the present invention will be described as follows.

(Preferred embodiment 1)

FIG. 1 is a sectional part of a substantial part for showing a connecting structure of concrete blocks in the first preferred embodiment of the present invention. 1a, 1a' denote a pair of connected PC members; 2 denotes a metallic connector having projections at extremity ends of a hollow rod-like member embedded in the connecting surfaces of the PC members 1a, 1a'; 3 denotes a hollow part for use in pouring adhesive agent with its both ends being formed in a central longitudinal direction of the connector 2; 4 denotes two projections formed at symmetrical positions of extremity ends of adhesive agent flowing-out part of the connector 2; 5 denotes connection holes for use in inserting and fixing a rod-like member of the connector 2 formed to be communicated with the connecting surfaces of the PC members 1a, 1a'; 6 denotes adhesive agent poured from one end of the hollow part 3 of the connector 2, flowed out of the other end of the hollow part 3 and filled between the surface of the connector 2 and the circumferential walls of the connection holes 5; and 7 denotes a plug embedded into the opening of the connection hole 5 made of concrete, mortal, rubber or the like.

Figure 2:
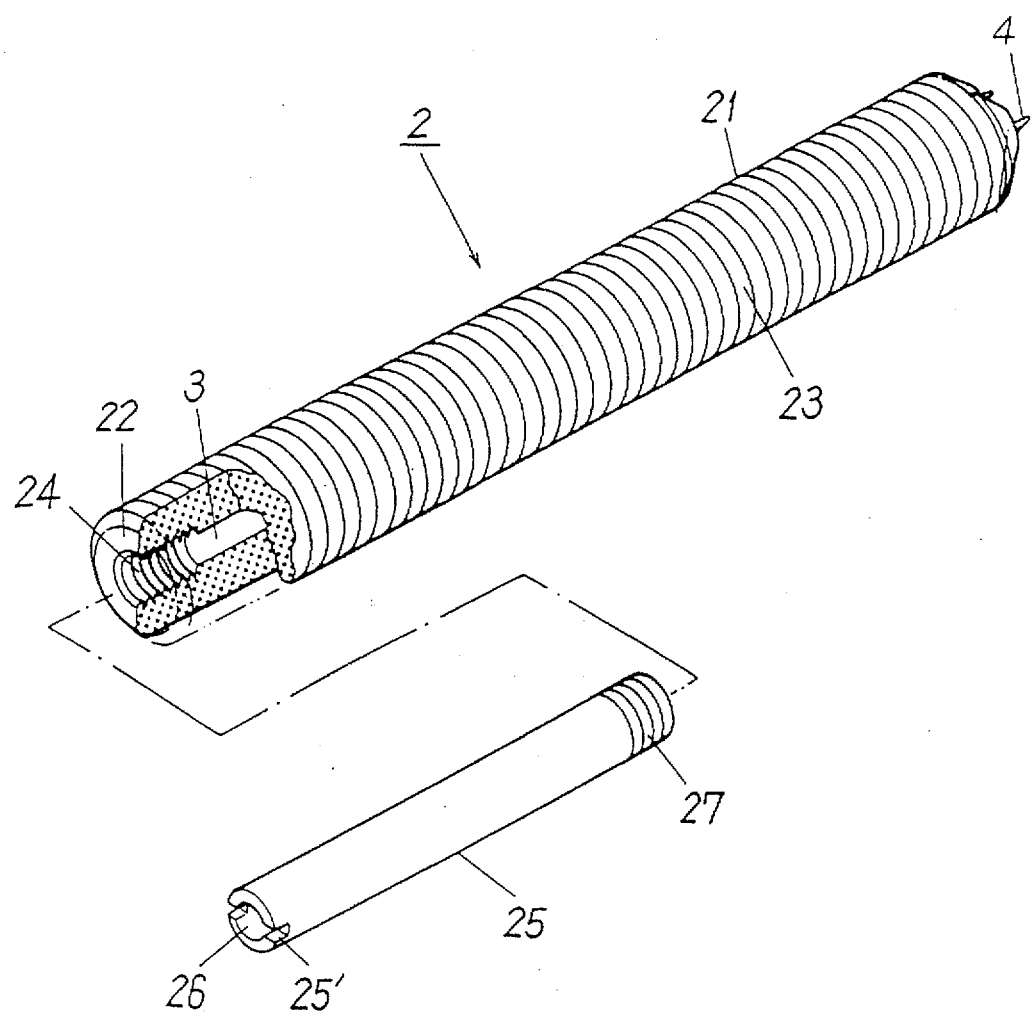
FIG. 2 is an exploded perspective view of a connector in the first preferred embodiment of the present invention.

In FIG. 2, 2 denotes connector; 3 denotes adhesive agent flowing-in hollow part; 4 denotes projections; 21 denotes a metallic hollow rod-like member; 22 denotes branch pipe engaging end part of rod-like member 21; 23 denotes convex or concave portions formed spirally at the outer surface; 24 denotes engaging part to rod-like member formed spirally at the hollow part 3 of branch pipe engaging end part 22 of rod-like member 21; 25 denotes branch pipe made of synthetic resin engaging spirally to engaging part to rod-like member 24 of rod-like member 21; 25' denotes an engaging groove inserted into and fixed to a drill and the like, when an engaging a branch pipe 25 formed at the end part of the branch pipe 25 with the rod-like member side engaging part 24 of branch pipe engaging end part 22 is released; 26 denotes a branch pipe hollow part communicated with the hollow part 3 of the rod-like member 21; 27 denotes engaging part engaged with rod-like member side engaging part 24 formed spirally at the end part of branch pipe 25.

A connecting method for the connecting structure of concrete blocks constructed as described above will be described as follows.

Figure 3:
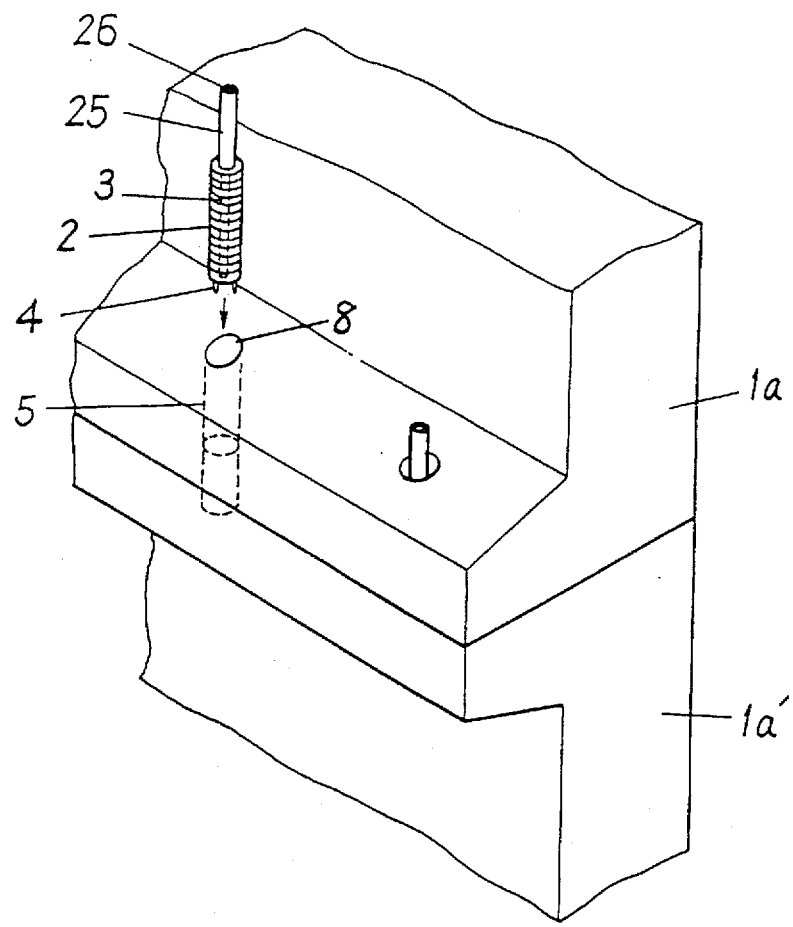
FIG. 3 is a sectional view of a substantial part showing a connecting method of concrete blocks in the first preferred embodiment of the present invention.
Figure 4:
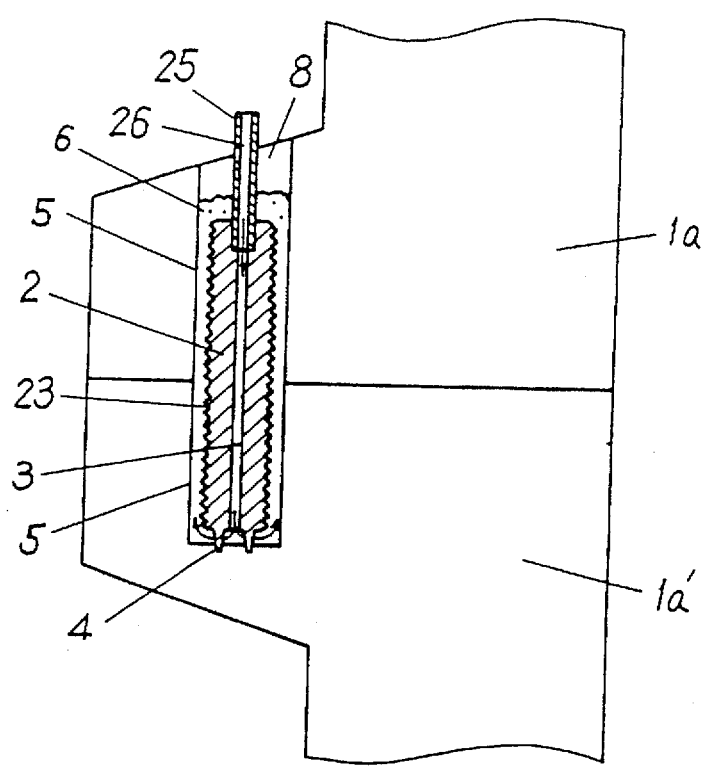
FIG. 4 is a sectional view of a substantial part of connection holes for schematically showing a flow of adhesive agent in a connecting method of the concrete blocks in the first preferred embodiment of the present invention.

FIG. 3 is a perspective view of a substantial part for showing a connecting method for concrete blocks in the first preferred embodiment of the present invention. FIG. 4 is a sectional view of a substantial part of connection holes for schematically showing a flow of adhesive agent in the connecting method for concrete blocks in the first preferred embodiment of the present invention. 8 denotes an opening of connection holes 5.

At first, connection holes 5 having a diameter slightly larger than that of each of rod-like members 21 of the connector 2 and having a length slightly deeper than that of each of the rod-like members 21 are punched with a drill and the like at the abutting surfaces of a pair of PC members 1a, 1a' to be connected to each other. Then, adhesive agent 6 is applied to the abutting surfaces of a pair of PC members 1a, 1a' to be connected to each other as required, thereafter the connector 2 is inserted into and fixed to the connection holes 5 and each of the abutting surfaces are struck against to each other with the PC members 1a, 1a' being set in a horizontal orientation.

Then, they are held by holders such as wires, turnbuckles, pipe supports and the like as required in such a manner that the connected parts may not be separated from each other, thereafter adhesive agent of epoxy resin is poured at the opening of the branch pipe, and since the adhesive agent can be visually confirmed from the branch pipe and the opening 8 of the connection hole 5, resulting in that the adhesive agent is poured until the adhesive agent is overflown.

As shown in FIG. 4, the adhesive agent 6 is poured from the branch pipe hollow part 26 of the branch pipe 25 and further as shown by an arrow, the adhesive agent passes through the hollow part 3 of the connector 2 and fills a clearance between the surface of the connector 2 and the circumferential walls of the connection holes 5. In this case, a channeling or a short pass of the adhesive agent 6 is prevented under an effect of buffering at the projections or irregularities formed at the surface of the connector 2 and the adhesive agent 6 is filled in the clearance with a scarce leakage of it.

In addition, a subsequent feeding of the adhesive agent 6 enables the adhesive agent 6 to be visually confirmed for its ascending while filling the clearance between the outer surface of the branch pipe 9 and the circumferential walls of the connection holes 6, resulting in that some filling patterns can be prevented. Then, after removing the branch pipe 9, the opening 8 of the connection hole 5 is processed with sealing treatment by the plug 7 of concrete or rubber or mortar and the like as required. Upon curing the adhesive agent 6, the holder such as the pipe support and the like are removed as required.

As described above, according to the preferred embodiment, the connecting work for the PC members is a quite simple work in which the connection holes 5 are merely formed at the connecting surfaces, wherein the connecting method is also a quite simple work in which the connector 2 is inserted into and fixed to the connection holes 5 and the adhesive agent 6 is merely poured into the connection holes and a connecting structure having a superior mechanical strength can be obtained.

In addition, since it can be visually confirmed whether or not the adhesive agent 6 is sufficiently filled in the holes, it is possible to get a strong connecting structure having no adhering patterns. In addition, since the surface of the connector is covered with the adhesive agent 6, no corrosion and the like occur due to salt damage or deformation.

Figure 5:
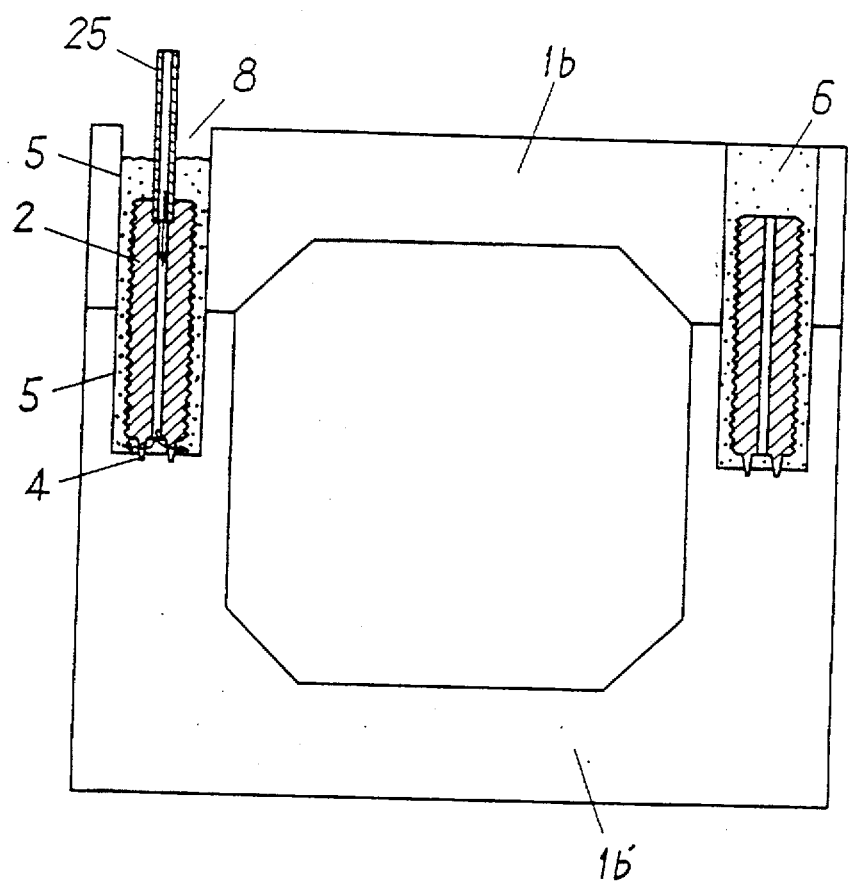
FIG. 5 is a sectional view of a substantial part showing an example of another application of a connecting structure of concrete blocks in the first preferred embodiment of the present invention.

In the preferred embodiment, the adhesive agent is of epoxy resin adhesive agent, although the adhesive agent may be of mortar and the like as shown in FIG. 5. is a sectional view of a substantial part for showing another example of application of the connecting structure of concrete blocks in the first preferred embodiment of the present invention. This preferred embodiment is similar to the first preferred embodiment except that U-shaped water discharging blocks are applied as the PC members 1b', 1b' to be connected from each other, mortar is poured as adhesive agent and a plug is eliminated, so that its description will be eliminated.

(Preferred embodiment 2)

Figure 6:
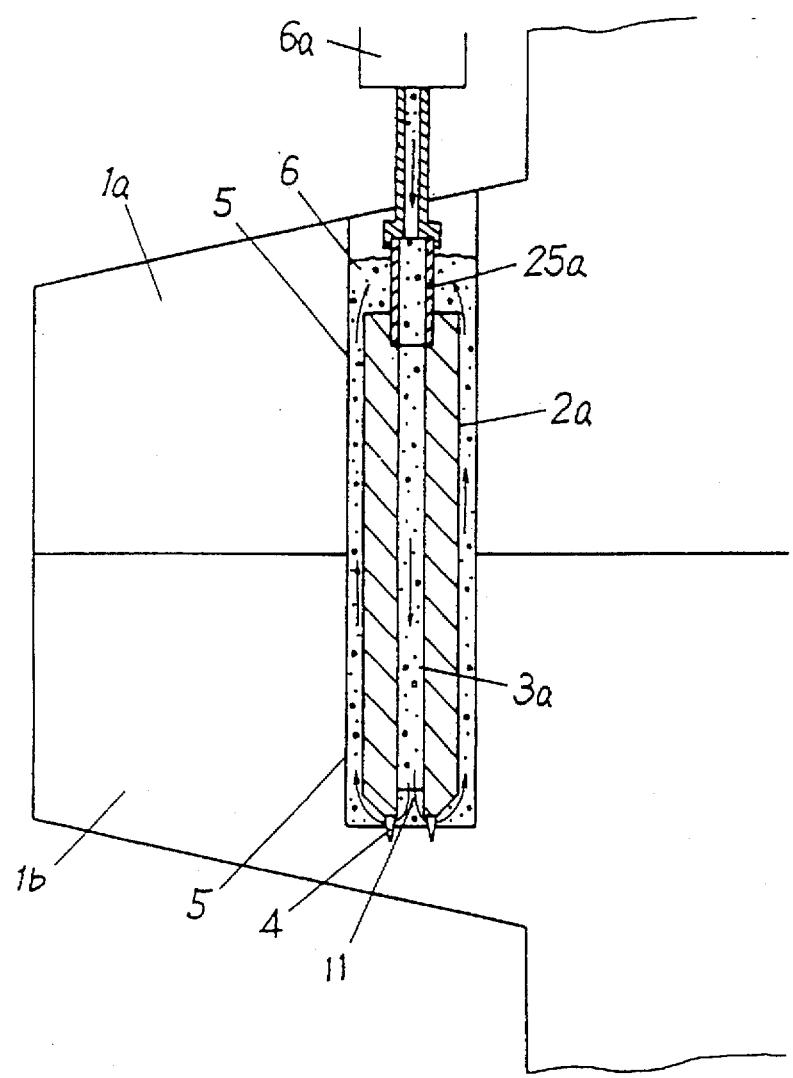
FIG. 6 is a sectional view of a substantial part of connection holes for schematically showing a flow of adhesive agent in a connecting method of the concrete blocks in the second preferred embodiment of the present invention.

FIG. 6 is a sectional view of a substantial part of connection holes for schematically showing a flow of the adhesive agent in a connecting method of concrete blocks in the second preferred embodiment of the present invention.

FIG. 7(a) is a side elevational view of the connector in the second preferred embodiment, FIG. 7(b) is a perspective view for showing a substantial part of the flowing-out end of the adhesive agent and FIG. 8 is a front elevational view for showing a substantial part of the flowing-out end of the adhesive agent in various rod-like members of the connector in the second preferred embodiment.

2a denotes a metallic connector to which the branch pipe is removably engaged in the second preferred embodiment; 21a denotes a metallic hollow round rod-like member; 28 denotes an adhesive agent guiding groove formed in a concave shape at the surface of the adhesive agent flowing-out end formed to be an expanded shape; and 29 denotes an adhesive agent flowing-out end of the rod-like member 2 formed to be in an expanded shape.

In FIG. 8, (a) denotes a state in which a sectional shape of the rod-like member 21a is formed to be a substantial circular shape so as to facilitate an insertion of the rod-like member into a connection hole having a rough cut surface.

In FIG. 8, (b) denotes a state in which a sectional shape of the rod-like member 21a is of a substantial ellipse, wherein its object consists in dispersion of external force of the PC members connected at a right angle or crossed in slant as well as its reinforcement and prevention of rotation of the PC member. In particular, a bending stress applied from a direction of long diameter side is enforced. (c) to(e) denote a member of substantial rectangular shape or substantial hexagonal shape, a substantial triangular shape which is suitable for preventing a rotation between the PC members and connecting them to each other. In the examples of application (b) to (e), the rod-like members are not rotated, so that the projection part 4 toward the adhesive agent flowing-out end part may not be formed.

A content of this preferred embodiment differing from that of the first preferred embodiment consists in the fact that a connector 2a formed with an adhesive agent guiding groove 28 at an extremity end opening of an adhesive agent flowing-out side of the rod-like member is applied as a connector.

The connecting structure and the connecting method in the second preferred embodiment are similar to those of the first preferred embodiment and their description will be eliminated.

As described above, according to the preferred embodiment, since the adhesive agent flowing-out part of the connector is formed with the adhesive agent guiding groove 28, even if the adhesive agent such as mortar having a relative high viscosity is applied, the adhesive agent can be filled easily and without any air voids. In addition, in the case that a branch pipe 25a does not constitute any hindrance against embedding of the connector after pouring the adhesive agent, it is possible to improve workability by embedding the branch pipe 25a together with the connector.

(Preferred embodiment 3)

Figure 9:
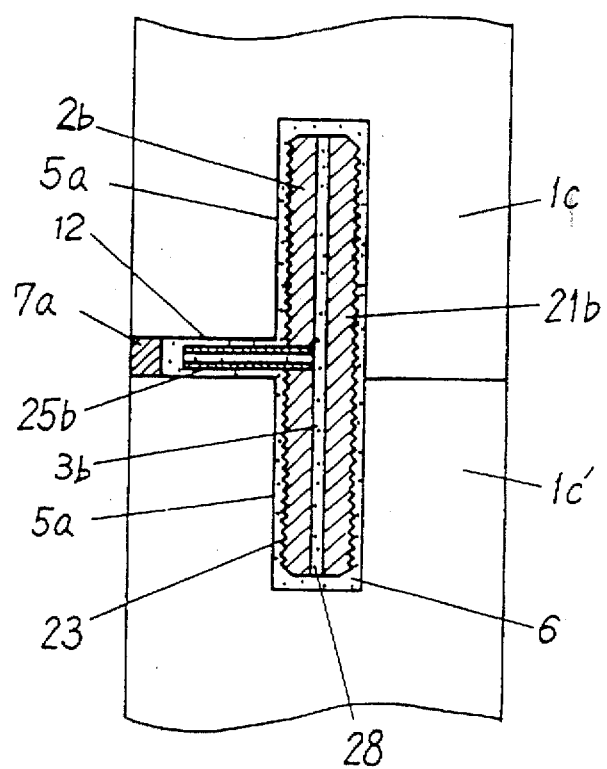
FIG. 9 is a sectional view of a substantial part showing a connecting structure of concrete blocks in the third preferred embodiment of the present invention.
Figure 10:
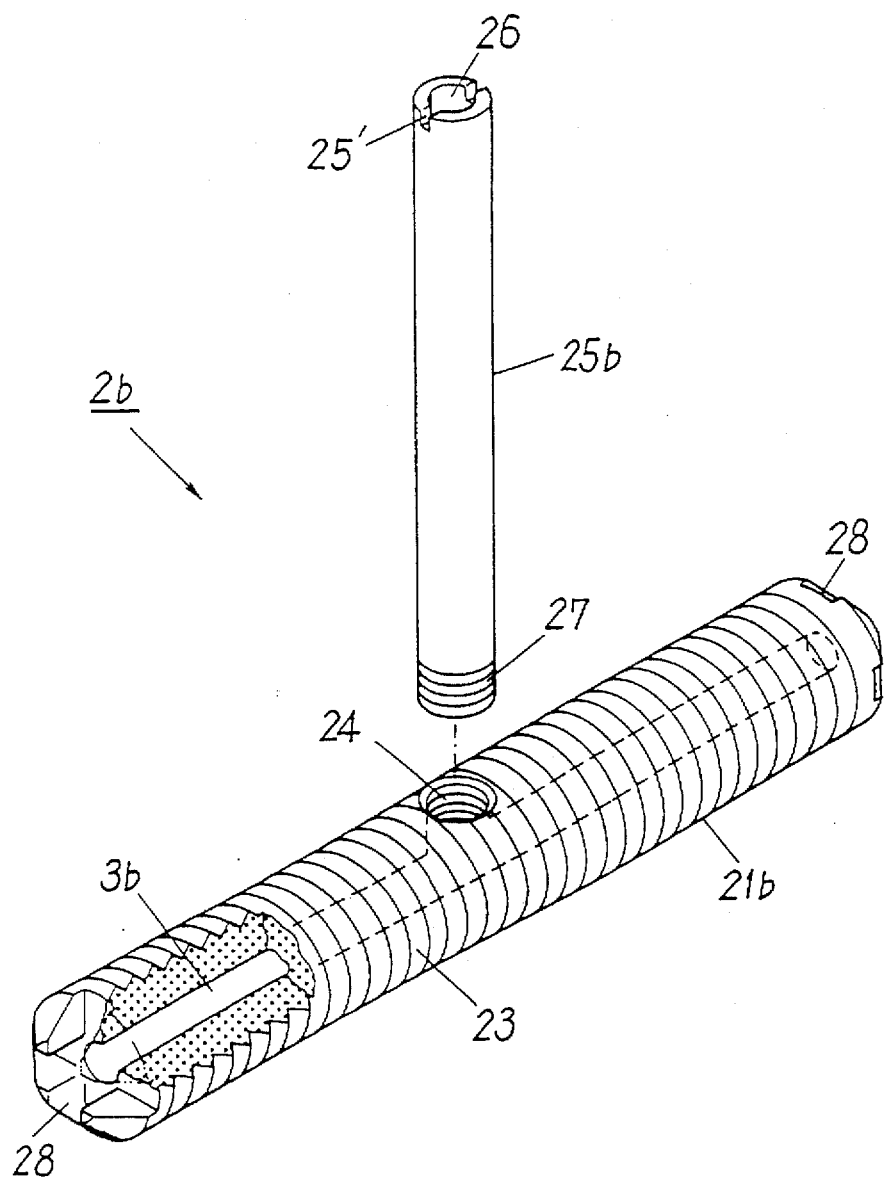
FIG. 10 is a perspective view partly with broken line of a connector in the third preferred embodiment of the present invention.

FIG. 9 is a sectional view of a substantial part for showing a connecting structure of concrete blocks in the third preferred embodiment of the present invention. FIG. 10 is a sectional view of a substantial part of connection holes for schematically showing a flow of adhesive agent in a connecting method of concrete blocks in the fourth preferred embodiment or the present invention. 1c, 1c' denote a pair of PC members to be connected from each other; 2b denotes a metallic connector having a branch pipe 25b fixed for use in pouring adhesive agent at a substantial central part in a longitudinal direction of a hollow rod-like member 21b embedded in the connecting surfaces of the PC members 1c, 1c'; 3b denotes a hollow part for use in pouring the adhesive agent opened at both ends formed in a central longitudinal direction of the connector 2b; 5a denotes connection holes for use in inserting and fixing the rod-like member 21b of the connector 2b punched to be communicated with the abutting surfaces of the PC members 1c, 1c'; 6 denotes adhesive agent poured from the opening of the branch pipe 25b of the connector 2b, flowed out of openings at both ends of the hollow part 3b of the connector 2b and filled between the surface of the connector 2b and the circumferential walls of the connection holes 5a; 12 denotes a branch pipe installing groove cut and formed at one abutting surface of the connection hole 5'; and 7a denotes a plug embedded at the opening of the branch pipe installing groove 12. 12 denotes a branch pipe installing groove cut and formed from the opening of the engaging hole 5a of the PC member 1c along the abutting surface; 23 denotes convex or concave portions formed at the surface of the rod-like member; 24 denotes an engaging part of the rod-like member to be engaged with the engaging part 27 of the branch pipe 25b bored from the circumferential surface of the central part of the rod-like member 21b to the hollow part 3b; 25' denotes an engaging groove of the branch pipe 25b; and 26 denotes a branch pipe hollow part.

A connecting method of the connecting structure of concrete blocks constructed as described above will be described as follows.

Figure 11:
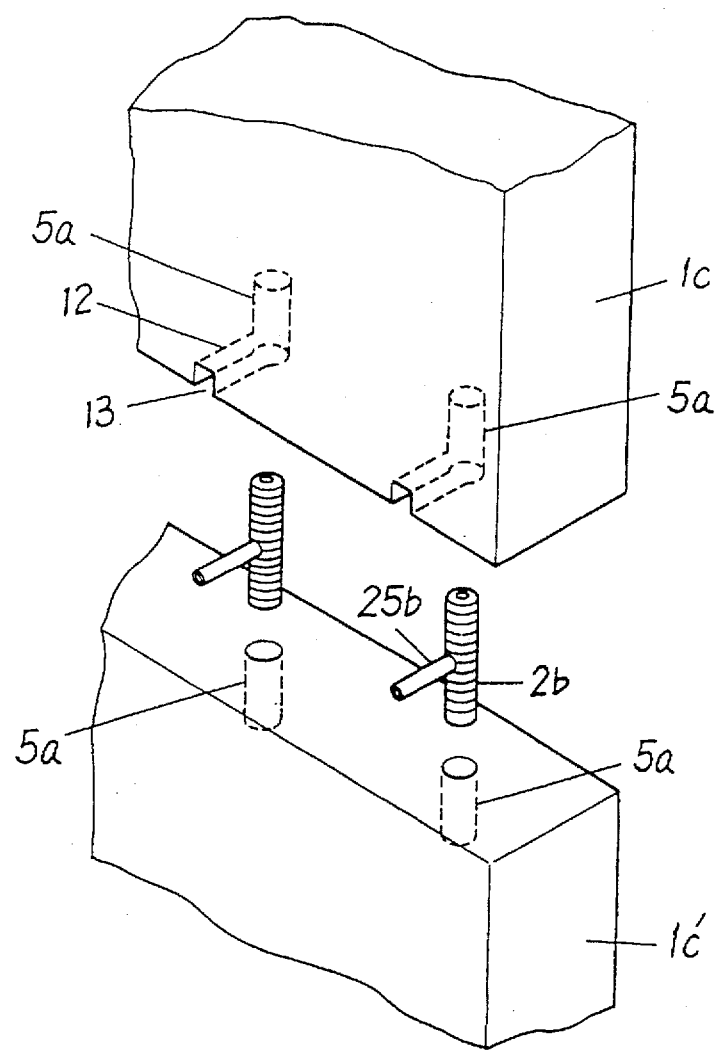
FIG. 11 is a sectional view of a substantial part showing a connecting method of concrete blocks in the third preferred embodiment of the present invention.
Figure 12:
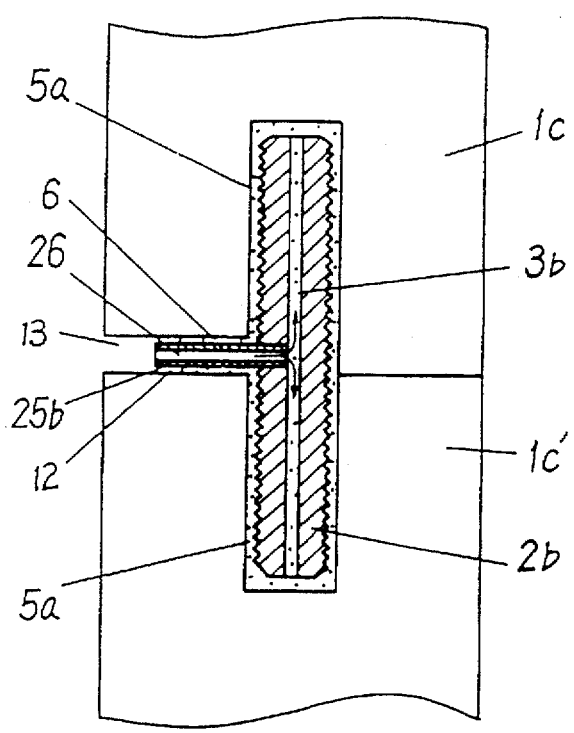
FIG. 12 is a sectional view of a substantial part showing an example of another application of a connecting structure of concrete blocks in the third preferred embodiment of the present invention.

FIG. 11 is a perspective view of a substantial part for showing a connecting method of concrete blocks in the third preferred embodiment of the present invention. FIG. 12 is a sectional view of a substantial part of each of the connection holes for schematically showing a flow of adhesive agent in the connecting method for concrete blocks in the third preferred embodiment of the present invention. 13 denotes an opening of a branch pipe installing groove 12.

At first, connection holes 5a are bored with a drill and the like at the abutting surfaces of each of the PC members 1c, 1c' having a diameter slightly larger than that of the connector 2b and having such a depth as one to cause the central part of the connector 2b to reach the connecting surfaces of each of the PC members 1c, 1c'. Then, the branch pipe installing groove 12 for use in installing the branch pipe 9b is formed at the abutting surface of one communicating connecting hole 5a. Then, the connector 2b having the branch pipe 25 fixed thereto is inserted into and fixed to the connecting hole 5a communicated with the abutting surfaces and each of the abutting surfaces is struck against to each other while the PC members 1c, 1c' are being placed in a horizontal orientation. Then, they are held by holders such as wires, or turn-buckles, pipe supports and the like as required in such a manner that their connected parts may not be separated from each other, thereafter an adhesive agent pouring gun (not shown) is installed at the opening of the branch pipe 9b, the epoxy resin adhesive agent 6 is filled in the connection hole 5' through the hollow part 3b of the connector 2b until the adhesive agent 6 is visually confirmed at the opening 13 of the branch pipe installing groove 12 while the adhesive agent is filling the connection hole 5' from both end openings of the connector 2b.

As shown in FIG. 12, the adhesive agent 6 poured into the hollow part 26 of the branch pipe, passes through the hollow part 3b of the connector 2b and fills from the bottom part of connection hole 5a venting air to outside in a clearance between the outer surface of the connector 2b and the circumferential walls of the connection hole 5a. In this case, the surface of the connector 2b is formed with projections 23 for use in preventing channeling or short pass of the adhesive agent under an effect of buffer in the same manner as that of the preferred embodiment 1, so that the adhesive agent 6 is filled in the clearance with a scarce leakage. In addition, upon continuation of feeding of adhesive agent, it can be visually confirmed that the adhesive agent 6 returns back while it is filling the clearance between the branch pipe 9b and the circumferential walls of the branch pipe installing groove 12.

Then, the opening 13 of the branch pipe installing groove 12 is provided with a sealing processing by a plug and the like. After curing of the adhesive agent 6, the holders such as the pipe supports and the like are removed if the holders are used.

As described above, according to the preferred embodiment, it is possible to get the connecting structure having a superior mechanical strength by a quite simple work in which the connected surfaces of the PC members to be connected to each other are punched with some communicated connection holes and the abutted surface of connection hole is formed with the branch pipe installing groove and the connecting method is also a quite simple work for pouring the adhesive agent into the connector.

In addition, since it can be visually confirmed whether or not the adhesive agent is sufficiently filled in the same manner as that of the preferred embodiment 1, it is possible to get the rigid connecting structure having no adhering pattern.

In the preferred embodiment, although the connecting holes or the branch pipe installing grooves are punched from the connecting surfaces of the PC members, they may be formed in advance when the PC members are manufactured.

(Preferred embodiment 4)

Figure 13:
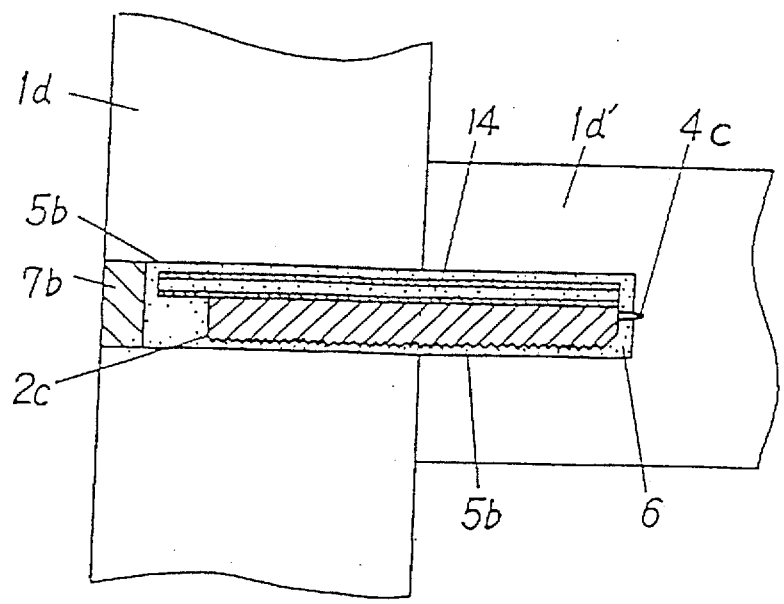
FIG. 13 is a sectional view of a substantial part showing a connecting structure of concrete blocks in the third preferred embodiment of the present invention.

FIG. 13 is a sectional view of a substantial part of a connecting structure of concrete blocks in the fourth preferred embodiment of the present invention. 1d, 1d' denote a pair of PC members to be connected to each other; 2c denotes a metallic connector having a projection 4c at an extremity end where a pipe-like adhesive agent feeding pipe 14 is installed in a longitudinal direction of an outer circumferential surface of a solid rod-like member embedded at the joint connected surfaces of the PC members 1d, 1d'; 5b denotes connection holes formed to be communicated with the abutting surfaces of a pair of PC members 1d, 1d' connected from each other; 6 denotes adhesive agent poured from the adhesive agent flowing-in part of the adhesive agent feeding pipe 14, flowed out from the adhesive agent flowing-out part to the bottom part of connection hole 5b and filled between the outer surface of the connector 2c and the circumferential wall of the connection hole 5b venting air to outside; and 7b denotes a plug embedded at the opening of the connection hole 5b.

A connecting method for the concrete blocks constructed as described above will be described as follows.

Figure 14:
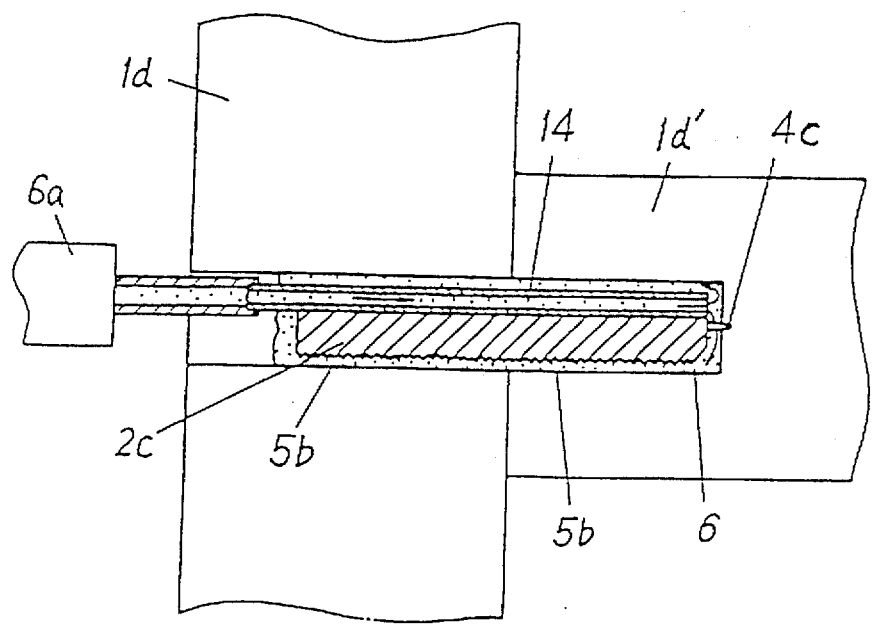
FIG. 14 is a sectional view of a substantial part of connection holes for schematically showing a flow of adhesive agent in a connecting method of the concrete blocks in the fourth preferred embodiment of the present invention.

FIG. 14 is a sectional view of a substantial part of a connection hole for schematically showing a flow of adhesive agent in the connecting method for the concrete blocks in the fourth preferred embodiment of the present invention. 6a denotes an adhesive agent pouring gun.

Connection holes 5b having a diameter slightly larger than that of the connector 2c are bored with a drill and communicated with the abutting surfaces of the PC members 1d, 1d' with such a depth as one to cause the central part of the connector 2c to reach the joint connected surfaces. Then, the PC members 1d, 1d' are abutted to each other in such a manner that the connection holes 5b are communicated from each other and the members are temporarily fixed by a supporting connector. The connector 2c is inserted into the connection holes 5b and the projection 4c is pierced into the bottom part of the connection hole 5b. Then, the adhesive agent pouring gun 6a is installed at the opening of a pipe-like adhesive agent feeding pipe 14 and the adhesive agent is filled in the connection holes 5b through the hollow part of the pipe-like adhesive agent feeding pipe 14 until the adhesive agent 6 is visually confirmed at the opening of the connection hole 5b. The adhesive agent 6 is poured at the opening of the pipe-like adhesive agent feeding pipe 14 and as indicated by an arrow as shown in FIG. 14, the adhesive agent fills the clearance between the connector 2c and the circumferential walls of the connection holes 5b. In this case, either the channeling or the short pass of the adhesive agent 6 is prevented under an effect of buffer at the irregularities of surface of the connector 2c and so the adhesive agent 6 is filled in the clearance with a scarce leakage of it.

In addition, continuing of pouring of the adhesive agent 6 enables the adhesive agent 6 to be visually confirmed to return while filling the clearance between the outer surface of the pipe-like adhesive agent feeding pipe 14 and the connection holes 5b, resulting in that it is possible to prevent the charging patterns from being generated.

Upon visual confirmation of the adhesive agent 6 at the openings of the connection holes 5b, the engaged state between the adhesive agent pouring gun 6a and the adhesive agent feeding pipe 14 is released. During this period, since the connector 2c is fixed to the bottom part of the connection hole 5b with the projection 4 at its extremity end, it is not rotated or removed. Then, a plug 7b is embedded in flush with the opening of the connection hole 5b.

As described above, according to the preferred embodiment, the joint work at the PC members is a quite simple work and a quite easy work of forming the communication holes with a drill or the like, resulting in that it is possible to get the connecting structure having a superior mechanical strength.

In addition, since it is possible to make a visual check whether or not a sufficient filling of the adhesive agent occurs, it is possible to get the rigid connecting structure having no air voids in the adhesive agent. In addition, since the metallic solid connector is embedded at the connected parts, its yield force can be maintained against external forces such as earthquake or typhoon due to mechanical strength of the connector. In addition, since the connector is covered at its surface with adhesive agent, it may not be rusted by salt damage or immersed water or the like, resulting in that its safety characteristic can be remarkably improved.

(Preferred embodiment 5)

Figure 15:
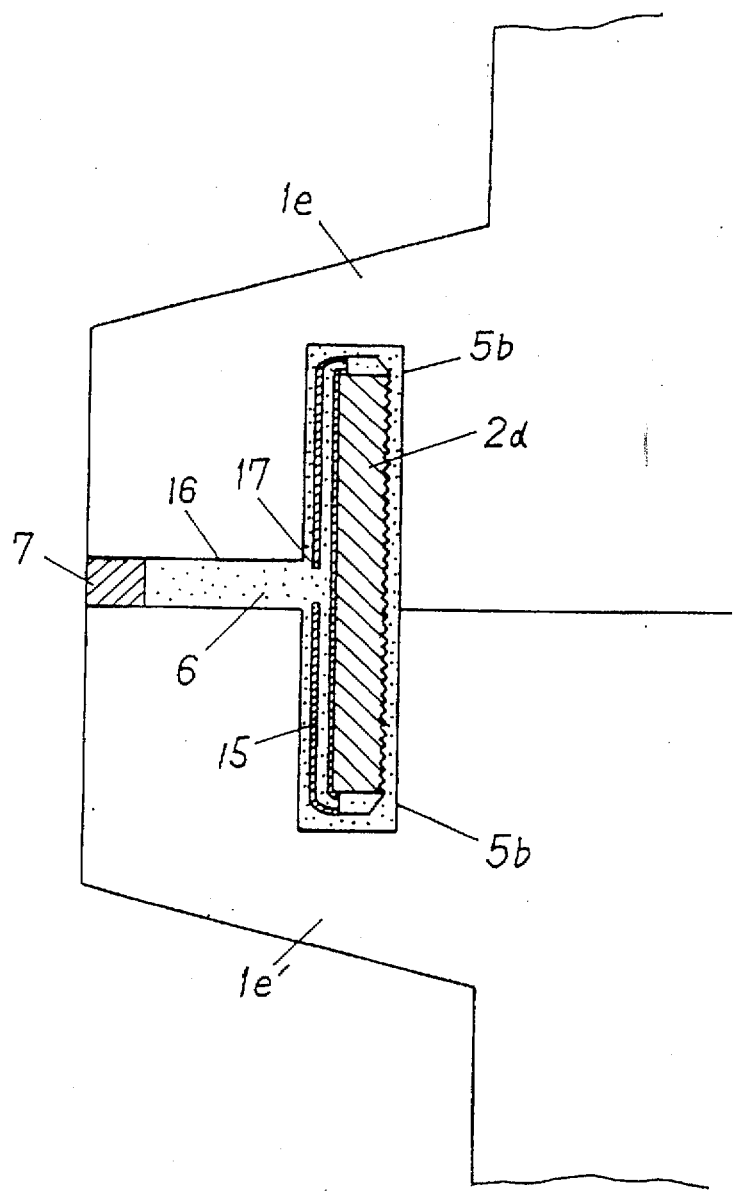
FIG. 15 is a sectional view of a substantial part showing a connecting structure of concrete blocks in the fifth preferred embodiment of the present invention.

FIG. 15 is a sectional view of a substantial part for showing a connecting structure of concrete blocks in the fifth preferred embodiment of the present invention.

1e, 1e' denote a pair of PC members connected to each other; 2d denotes a metallic connector in which the adhesive agent flowing-in part is provided at a central part in a longitudinal direction of the outer circumferential surface of the solid rod-like member embedded at the connected surfaces of the PC members 1e, 1e' and further both ends are provided with an adhesive agent flowing-out part; 5b denotes a connection hole formed to be communicated at the connected surfaces of the PC members 1e, 1e', for use in inserting and fixing the rod-like member of the connector 2d; 6 denotes an adhesive agent poured from the adhesive agent pouring part at the central part in a longitudinal direction of the adhesive agent feeding pipe 15, flowed out of the adhesive agent flowing-out parts at both ends and filled between the surface of the rod-like member of the connector 2d and the circumferential walls of the connection holes 5b; and 16 denotes an adhesive agent flowing-in part installing groove cut and formed at the abutted surfaces from the opening of end of the connection holes 5b.

A connecting method for the connecting structure of concrete blocks constructed as described above will be described as follows.

Figure 16:
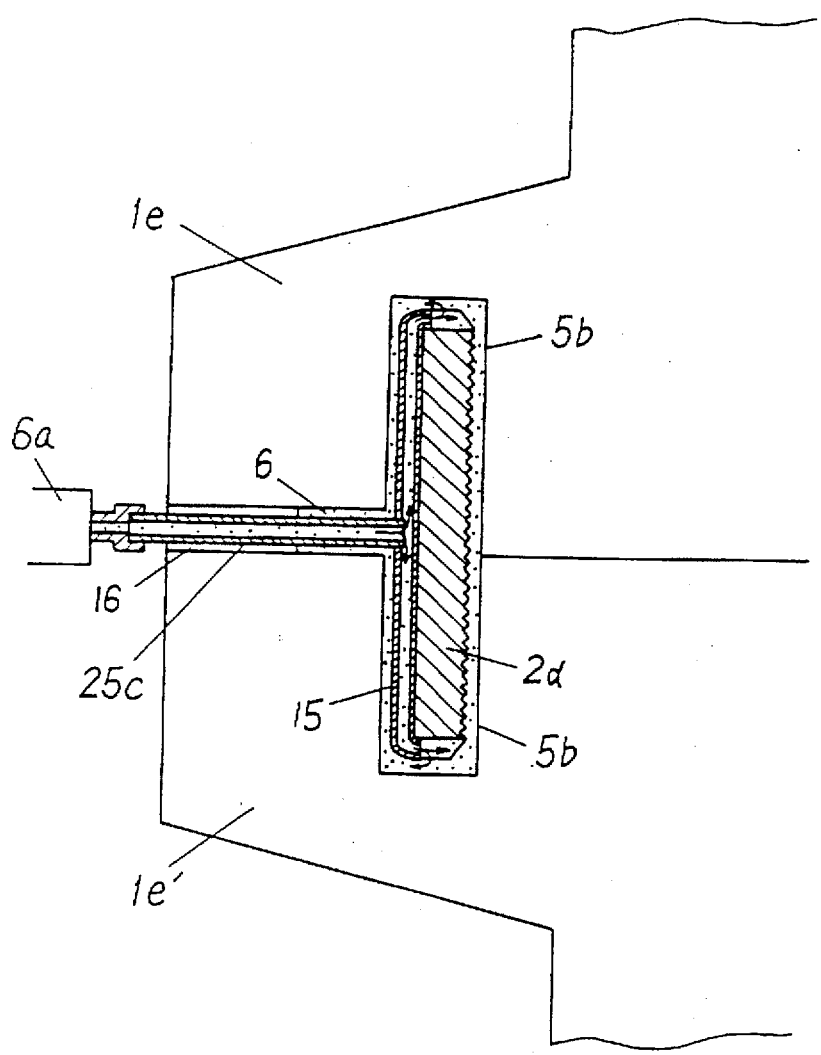
FIG. 16 is a sectional view of a substantial part of connection holes for schematically showing a flow of adhesive agent in a connecting method of the concrete blocks in the fifth preferred embodiment of the present invention.

FIG. 16 is a sectional view of a substantial part of connection holes for schematically showing a flow of adhesive agent in the connecting method of concrete blocks in the fifth preferred embodiment of the present invention.

25c denotes a branch pipe-like adhesive agent flowing-in part engaged at the central part of the adhesive agent feeding-in pipe 15.

At first, connection holes 5b having a substantial same diameters that of the connector 2d and having such a depth as one to cause a central part of the connector 2d to reach the connected surfaces of the PC members 1e, 1e' are formed to be communicated with the abutted surfaces of the PC members 1e, 1e' connected to each other, and an adhesive agent flowing-in part installing groove 16 is formed in advance at the abutting surface of one connection hole 5b to be communicated. Then, the connector 2d having the adhesive agent feeding-in pipe 15 provided with the adhesive agent flowing-in part 17 is inserted into the connection holes 5b communicated with the abutted surfaces, the PC members 1e, 1e' are abutted to each other and temporarily fixed by supporters and the like according to requirements.

Then, an adhesive agent pouring gun 6a is installed at the branch pipe 17 of the adhesive agent feeding pipe 15, and the adhesive agent 6 is filled in the connection hole 5b until the adhesive agent 6 is visually confirmed at the opening of the adhesive agent flowing-in part installing groove 16 while filling the surface of the connector 2c an d the connection holes 5b through openings at both ends of the adhesive agent feeding-in pipe 15.

As shown in FIG. 12, the adhesive agent 6 is poured at the opening of the adhesive agent flowing-in part 17 of the adhesive agent feeding-in pipe 15, flowed out of both opened ends of the pipe-like adhesive agent feeding-in pipe 15 and fills a clearance between the surface of the connector 2d and a circumferential wall of the connection hole 5'. In this case, since the surface of the connector 2d is formed with some projections for preventing channeling or short pass of the adhesive agent under an effect of buffer, the adhesive agent 6 is filled in the clearance with a scarce leakage of it. Further, continuation of pouring of the adhesive agent 6 enables the adhesive agent 6 to be visually confirmed to return back while filling the clearance between the adhesive agent flowing-in part 17 and the circumferential walls of the adhesive agent flowing-in part installing groove 16, resulting in that it is possible to prevent charging patterns.

Upon visual confirmation of the adhesive agent 6 at the opening of the adhesive agent flowing-in part installing groove 16, the engaged state between the adhesive agent flowing-in part and the adhesive agent feeding pipe 15 is released and then a plug is embedded in the opening of the adhesive agent flowing-in part installing groove 16.

As described above, according to the preferred embodiment, it is possible to get the connecting structure having a superior mechanical strength in which the connection holes are punched and formed to be communicated with the connected surfaces of the PC members connected to each other, the abutted surface of one connection hole is formed with the adhesive agent flowing-in part installing groove in a quite simple work and its connecting method is also carried out in a quite simple work for pouring the adhesive agent into the connector.

In addition, since it is possible to make a visual confirmation whether or not the adhesive agent is sufficiently filled in the structure in the same method as that of other preferred embodiments, it is possible to get the rigid connecting structure having no adhesive agent pattern. In addition, since the metallic solid connector is embedded at the connected parts, the mechanical strength of the connector enables its force of yield to be maintained against external forces such as earthquake or typhoon or the like. In addition, since the connector is covered at its surface with adhesive agent, the connector may not be rusted with salt damage or immersed water, resulting in that it is possible to improve its safety characteristic.

In the preferred embodiment, the connection holes or the adhesive agent flowing-in part installing grooves are bored at the connection surfaces of the PC members, although they may be formed in advance when the PC members are manufactured.

(Preferred embodiment 6)

Figure 17:
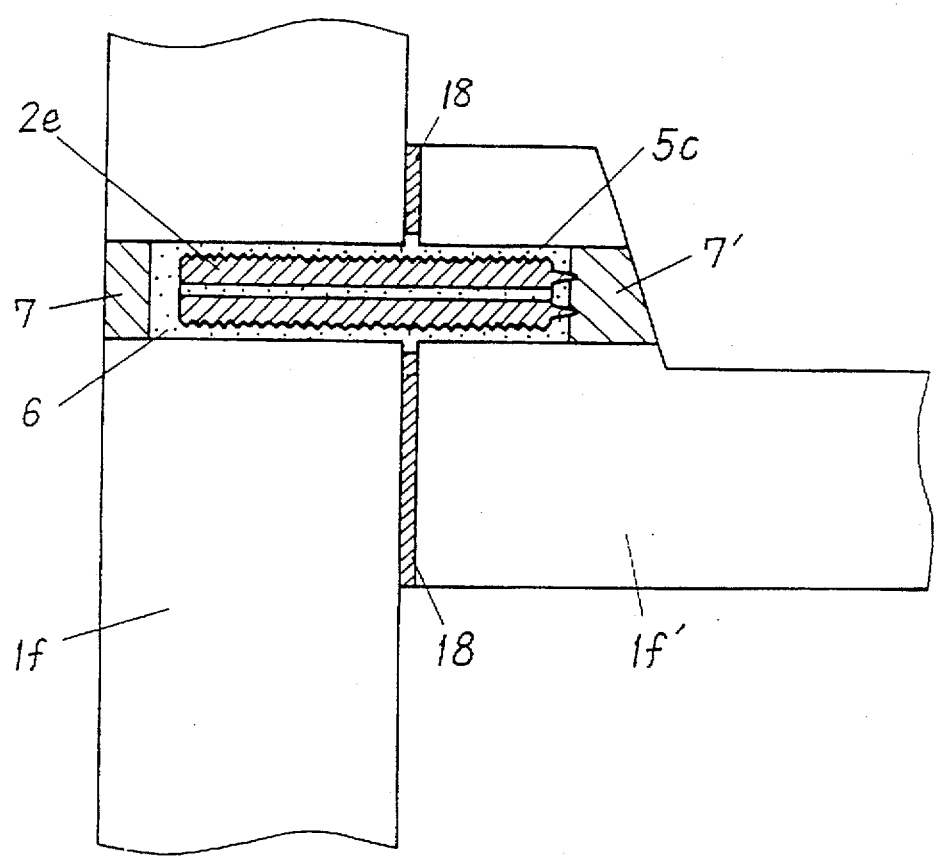
FIG. 17 is a sectional view of a substantial part showing a connecting structure of concrete blocks in the sixth preferred embodiment of the present invention.

FIG. 17 is a sectional view of a substantial part for showing the connecting structure of concrete blocks in the sixth preferred embodiment of the present invention.

Points differing from the first preferred embodiment of the present invention consist in the facts that the connected surfaces of the PC members 1f, 1f' connected to each other are bored in advance with through-pass holes 5c for use in embedding the connector, one end of the through-pass hole 5c is covered during connection to form the connection holes and the seal members 18 such as a double-surface adhesive tape or a seal and the like for preventing leakage of the adhesive agent are adhered to the connected surfaces.

A connecting method for the connecting structure of concrete blocks of the preferred embodiment constructed as described above will be described as follows.

At first, the opening opposite to the connected surface of the through-pass hole of the PC member if bored in advance is covered by a plug 7' made of concrete with such a space as one to enable a substantial half part of the connector 2e to be inserted into the hole being left and then the connection hole 5c is formed. Then, some seal members 18 are adhered to the connected surfaces of the PC member 1b" so as to prevent leakage of the adhesive agent and then the PC members 1f, 1f' are abutted from each other to be connected. Then, the connector 2e is inserted into and fixed at the opening of the connection hole 5c of the PC member if and the connection is carried out in the same method as that of the first preferred embodiment.

As described above, according to the preferred embodiment, since the seal members for preventing leakage of adhesive agent are adhered around the connection holes at the connected surfaces of the PC members connected to each other, it is possible to prevent adhesive agent from being leaked at the connected surfaces of the PC members during pouring of the adhesive agent and further it is possible to fill the connection holes without any air voids as well as to increase a connecting force.

| | |
|---|---|
| 1a, 1a', 1b, 1b', 1c, 1c', 1d, 1d', 1e, 1e', 1f, 1f' | PC member |
| 2, 2a, 2b, 2c, 2d, 2e | connector |
| 3, 3a, 3b | hollow part |
| 4, 4c | protrusion |
| 5, 5a, 5b, 5c | connection hole |
| 6, 6' | adhesive agent |
| 6a | adhesive agent pouring gun |
| 7, 7a, 7b | plug |
| 8 | opening part |
| 12 | branch pipe insertion and fixing groove |
| 13 | opening part of branch pipe insertion and fixing groove |
| 14, 15 | adhesive agent guiding pipe |
| 16 | branch pipe insertion and fixing groove |
| 17 | adhesive agent flowing-in part |
| 18 | seal material |
| 21 | rod-like member |
| 22 | branch pipe engaging end part |
| 23 | convex or concave portions |
| 24 | rod-like member side engaging part |
| 25, 25b, 25c | branch pipe |
| 25' | engaging groove |
| 26 | branch pipe hollow part |
| 27 | engaging end part |
| 28 | adhesive agent guiding groove |
| 29 | adhesive agent flowing-out end part |

What is claimed is:

1. A connecting structure of concrete blocks comprising concrete blocks with a pair of opposite connecting holes bored at abutting surfaces between said concrete blocks; a connector comprising a hollow rod-shaped member and a branch pipe engaged with one end of said hollow rod-shaped member, said hollow rod-shaped member inserted and fixed within said pair of opposing connecting holes; and an adhesive agent filled within said hollow rod-shaped member and between the exterior surface of said hollow rod-shaped member and the circumferential walls of said connecting holes.

2. A connecting structure of concrete blocks comprising concrete blocks with a pair of opposite connecting holes bored at abutting surfaces between said concrete blocks and a branch pipe installing groove on the surface of said abutting surfaces; a connector comprising a hollow rod-shaped member and a branch pipe engaging part at a longitudinal central part and said branch pipe engaging part having a hollow part at said rod-shaped member and communicated from an outer circumferential part of said rod-shaped member and a branch pipe fixed or removably engaged with said branch pipe engaging part, said rod-shaped member inserted and fixed in said pair of opposing connecting holes and said branch pipe in said groove; an adhesive agent poured into one end of said branch pipe flowed out of an opening at the end of said hollow part of said rod-shaped member, and thus filled between the surface of said connector and the circumferential walls of said connecting holes.

3. A connecting structure of concrete blocks comprising concrete blocks with a pair of opposing connecting holes bored at abutting surfaces between said concrete blocks; a connector comprising a solid rod-shaped member with an adhesive agent feeding pipe groove formed in a longitudinal direction of its outer circumferential surface and an adhesive agent feeding pipe having an adhesive agent feeding-in part at one end and an adhesive agent flowing-out part at the other end, said adhesive agent feeding pipe positioned in said groove, said feeding pipe further having sidewalls without perforations, said connector inserted and fixed within said pair of opposing connecting holes; an adhesive agent filled in an annular space between the exterior surface of said connector and the circumferential walls of said connecting holes and within said adhesive agent feeding pipe wherein when said adhesive agent is introduced to the said feeding-in part, said agent flows to the flowing-out part and then flows back the opposite direction into said annular space.

4. A connecting structure of the concrete blocks comprising concrete blocks with a pair of opposing connecting holes bored at abutting surfaces between said concrete blocks and a branch pipe installing groove on the surface of said abutting surfaces; a connector comprising a solid rod-shaped member with an adhesive agent feeding pipe groove formed in a longitudinal direction on said rod-shaped member's outer circumferential surface and an adhesive agent feeding pipe having adhesive agent exit opening parts at both ends and a branch pipe linked with said feeding pipe at its substantial central part, said connector inserted and fixed within said pair of opposing connecting holes and said branch pipe inserted and fixed within said branch pipe installing groove; and an adhesive agent filled between a space defining the exterior surface of said connector and the circumferential walls of said connecting holes.

5. A connecting method of concrete blocks comprising the steps of inserting and fixing a hollow connector into a pair of opposite connection holes in said concrete blocks having a diameter substantially the same as that of or slightly larger than a cross section of said hollow connector at each of the abutting surfaces and abutting each of the concrete blocks; introducing an adhesive agent from a non-abutting surface, wherein said adhesive agent flows from one end of said hollow connector and out of a second end and allowing said adhesive agent to then flow in the reverse direction and filling said adhesive agent in an annular space between the exterior surface of said hollow connector and the circumferential walls of said connection holes.

6. A connecting method of concrete blocks comprising the steps of proving a plurality of opposite bore holes in said blocks and a plurality of branch pipe installing grooves on an abutting surface of said concrete blocks for each pair of opposite bore holes, inserting and fixing a rod-shaped connector having a hollow passage and a branch pipe into said opposite bore holes and said branch pipe installing grooves, said bore holes having substantially the same diameter as or slightly larger than that of a cross section of the rod-shaped connector and said branch pipe installing groove having substantially the same diameter as or slightly larger than that of a cross section of said branch pipe and abutting each of the concrete blocks to each other; and pouring adhesive agent from an opening of the said branch pipe of said connector inserted into and fixed to the bore holes at the aforesaid step, flowing said adhesive agent out from openings of said hollow passage of said rod-shaped connector and then filling said adhesive agent between an exterior surface of said rod-shaped connector and a circumferential wall of said bore hole.

* * * * *